(12) United States Patent
Silbereisen et al.

(10) Patent No.: US 7,955,038 B2
(45) Date of Patent: Jun. 7, 2011

(54) TURNLOCK FASTENER

(75) Inventors: Friedrich Silbereisen, Efringen-Kirchen (DE); Jurgen Vollmer, Buggingen (DE)

(73) Assignee: A. Raymond et Cie, Grenoble (FR)

( * ) Notice: Subject to any disclaimer, the term of this patent is extended or adjusted under 35 U.S.C. 154(b) by 437 days.

(21) Appl. No.: 12/295,958

(22) PCT Filed: Apr. 5, 2007

(86) PCT No.: PCT/EP2007/003089
§ 371 (c)(1),
(2), (4) Date: Oct. 3, 2008

(87) PCT Pub. No.: WO2007/128375
PCT Pub. Date: Nov. 15, 2007

(65) Prior Publication Data
US 2009/0290932 A1    Nov. 26, 2009

(30) Foreign Application Priority Data

May 4, 2006  (DE) .......................... 10 2006 020 697

(51) Int. Cl.
*F16B 21/00*    (2006.01)
(52) U.S. Cl. ........................... 411/552; 411/549; 24/663

(58) Field of Classification Search .................. 411/349, 411/549–553; 24/663; 403/348, 349
See application file for complete search history.

(56) References Cited

U.S. PATENT DOCUMENTS

| 4,762,437 A | 8/1988 | Mitomi |
| 6,237,970 B1 | 5/2001 | Joannou |

FOREIGN PATENT DOCUMENTS

| DE | 19838560 A1 | 3/2000 |
| WO | WO2007/065520 A1 | 6/2007 |

*Primary Examiner* — Victor MacArthur
(74) *Attorney, Agent, or Firm* — Baker & Daniels LLP

(57) ABSTRACT

A turnlock fastener (1) for the connection of two components features a cover plate (4) and a base shaft (5) which is formed on the cover plate (4) and which extends away from the cover plate (4), at which at least two opposing rigid locking stands (10, 11) are positioned at a distance from the cover plate (4) and extend outward from the base shaft (5) in the radial direction. In addition, a fixing arrangement is provided to secure the turnlock fastener (1) to a first component which possesses at least two radial elastic spring limbs (14, 15) which are each arranged between two locking stands (10, 11) and which are connected at one end with the base shaft (5) and which extend away from the base shaft (5) with the other free end in the direction of the cover plate (4). That way, the turnlock fastener (1) can be secured ahead of time within certain relatively large dimensions of insertion openings of different sizes and with relatively large pullout forces.

8 Claims, 7 Drawing Sheets

TURNLOCK FASTENER

CROSS-REFERENCE TO RELATED APPLICATION

This application is a U.S. National Phase Patent Application based on International Application Serial No. PCT/EP2007/003089 filed Apr. 5, 2007, the disclosure of which is hereby explicitly incorporated by reference herein.

BACKGROUND OF THE INVENTION

1. Field of the Invention

The present invention relates to a turnlock fastener.

2. Description of the Related Art

One turnlock fastener is known from DE 198 38 560 A1. The known turnlock fastener for the connection of two components has a cover plate and a base piece molded to the cover plate. The base piece has a base shaft extending away from the cover plate, on which two opposing rigid locking arms are positioned at a distance from the cover plate and extend radially outward from the base shaft. Furthermore, a preliminary securing arrangement is provided in order to secure the turnlock fastener to a component.

In the known turnlock fastener, the preliminary securing arrangement is formed by cams projecting radially beyond the base shaft. These cams are designed to engage with openings similar to blind tappet holes that are open on one side and are positioned along one edge of an insertion opening in a component, in which the turnlock fastener is to be secured ahead of time.

The disadvantage to this design, however, is that the preliminary securing arrangement and the insertion opening must be very precisely matched to one another so that the engagement takes place. Additionally, with this design, the pullout force of the turnlock fastener in the preliminary securing arrangement is inadequate for some applications.

SUMMARY OF THE INVENTION

The present invention provides a turnlock fastener that can be secured in advance within certain relatively large dimensions of insertion openings of different sizes and with relatively large pullout forces.

Since the preliminary securing arrangement in the turnlock fastener according to the invention has radially elastic spring limbs, the turnlock fastener according to the invention can be placed in insertion openings with a relatively wide range of dimensions or relatively large tolerances and can be arranged in a pre-secured position in which the spring limbs grip the edge of the insertion opening from behind. This gripping from behind also results in a relatively high pullout force, since a very strong obstruction is created, preventing axial movement against the direction of insertion, due to the outward elasticity of the spring limbs after entering the insertion opening.

In one form thereof, the present invention provides a turnlock fastener to connect two components having a cover plate, with a base shaft molded onto the cover plate and extending away from the cover plate, on which, at a distance from the cover plate, at least two rigid locking stands sitting opposite one another and extending radially outward from the base shaft are placed, and with a fixing arrangement to secure the turnlock fastener to a first component, the fixing arrangement having at least two radially elastic spring limbs, each of which is arranged circumferentially between two locking stands and with one end connected with the base shaft and extending with the other, free end away from the base shaft toward the cover plate, characterized in that the spring limbs are arranged such that they grip from behind an insertion opening fashioned in a first component, that the locking stands each exhibit a starting bevel sitting on the front in the direction of rotation and that a surrounding sealing lip of a soft elastic material is placed on the side of the cover plate facing the base shaft, the distance between the contact sides of the locking stands facing the cover plate and the front side of the sealing lip facing away from the cover plate being arranged such that the sealing lip is deformed in a final fixing arrangement to achieve a sealing effect.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
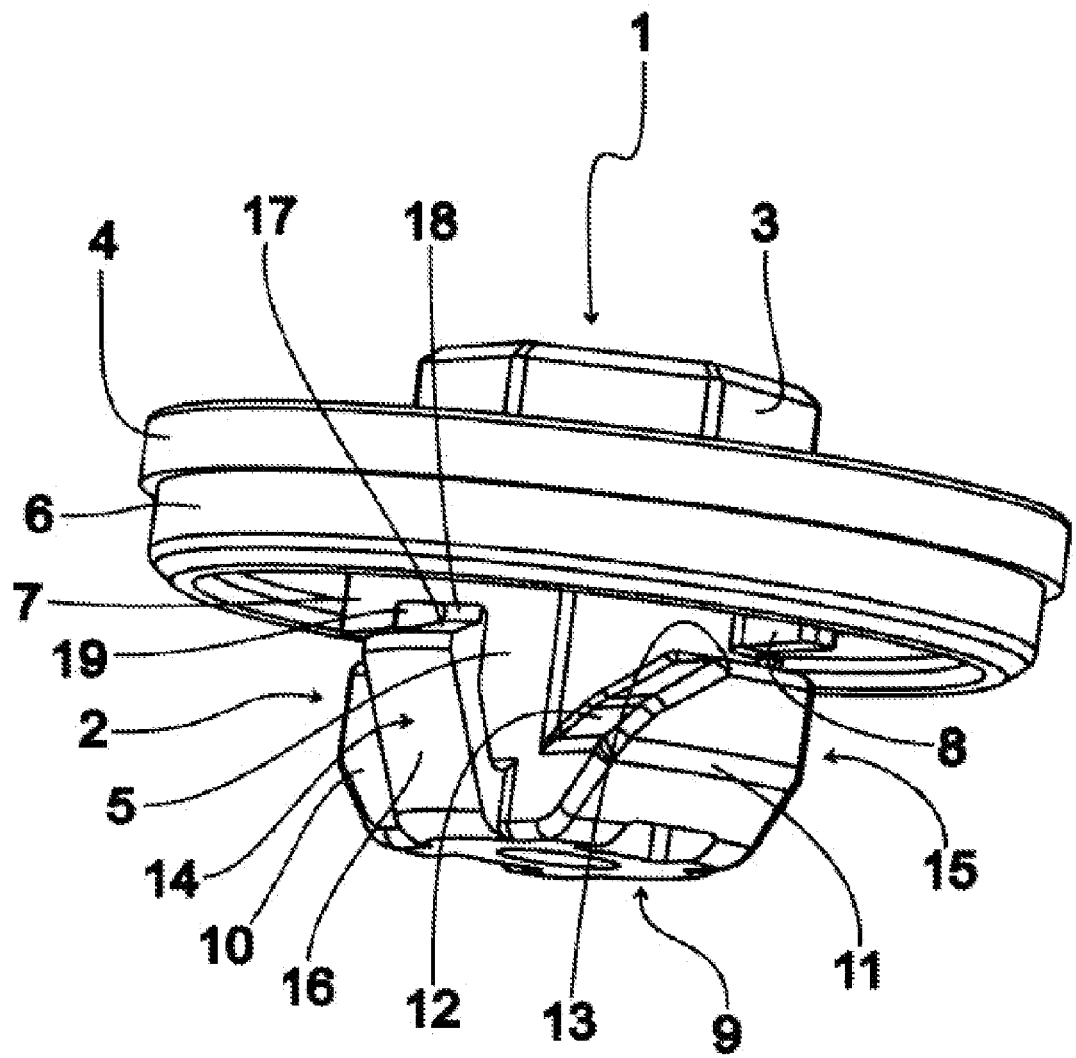
FIG. 1 shows a perspective view of an exemplary embodiment of a turnlock fastener according to the invention.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 shows a perspective view of an exemplary embodiment of a turnlock fastener 1 according to the invention. The exemplary turnlock fastener 1 has a base body 2 made of a hard elastic plastic material, in this exemplary embodiment having a hex head 3 as a tool catch structure, a disc-like cover plate 4 connected with the hex head 3 and extending radially beyond it and a base shaft 5 molded onto the side of the cover plate 4 located opposite the hex head 3 and extending away from the cover plate 4 in the axial direction.

Furthermore, the turnlock fastener 1 is equipped with a sealing lip 6 of a soft elastic material arranged along the outer edge of the cover plate 4 on the side of the base shaft 5 and connected with the cover plate 4.

In the neck area of the base shaft 5, elongated stop crosspieces 7, 8 are formed on the cover plate 4, arranged on both sides of the base shaft 5, extending radially away from the base shaft 5. Massive locking stands 10, 11 are molded opposite one another on the base end 9 of the base shaft 5 facing away from the cover plate 4, arranged on both sides of the base shaft 5 and projecting radially beyond the base shaft 5 and each having a starting bevel 12 on the front in the direction of rotation of the turnlock fastener 1, which rises in the direction of the cover plate 4 from the area of the respective locking stand 10, 11 that is turned towards the base end 9. Each starting bevel 12 transitions into a contact side 13 aligned at a right angle to the base shaft 5 and parallel to the cover plate 4.

Finally, the base body 2 has two spring limbs 14, 15, each arranged between the locking stands 10, 11 and connected with the base shaft 5 in the area of the base end 9. The spring limbs 14, 15 each have a leaf spring-like center segment 16, which extends from the base end 9 obliquely, with increasing distance, in the direction of the cover plate 4, and thus providing each spring limb 14, 15 a certain elasticity in the sense that the spring limbs 14, 15 are movable in the radial direction towards or away from the base shaft 5. At the free end of each spring limb 14, 15 opposite the base end 9, a front surface 17 is formed facing obliquely outward as well as an end crosspiece 18 extending axially. Furthermore, each spring limb 14, 15 has a securing tab 19, which sits on the front surface 17 approximately in the middle and extends outward radially from the end crosspiece 18.

Figure 2:
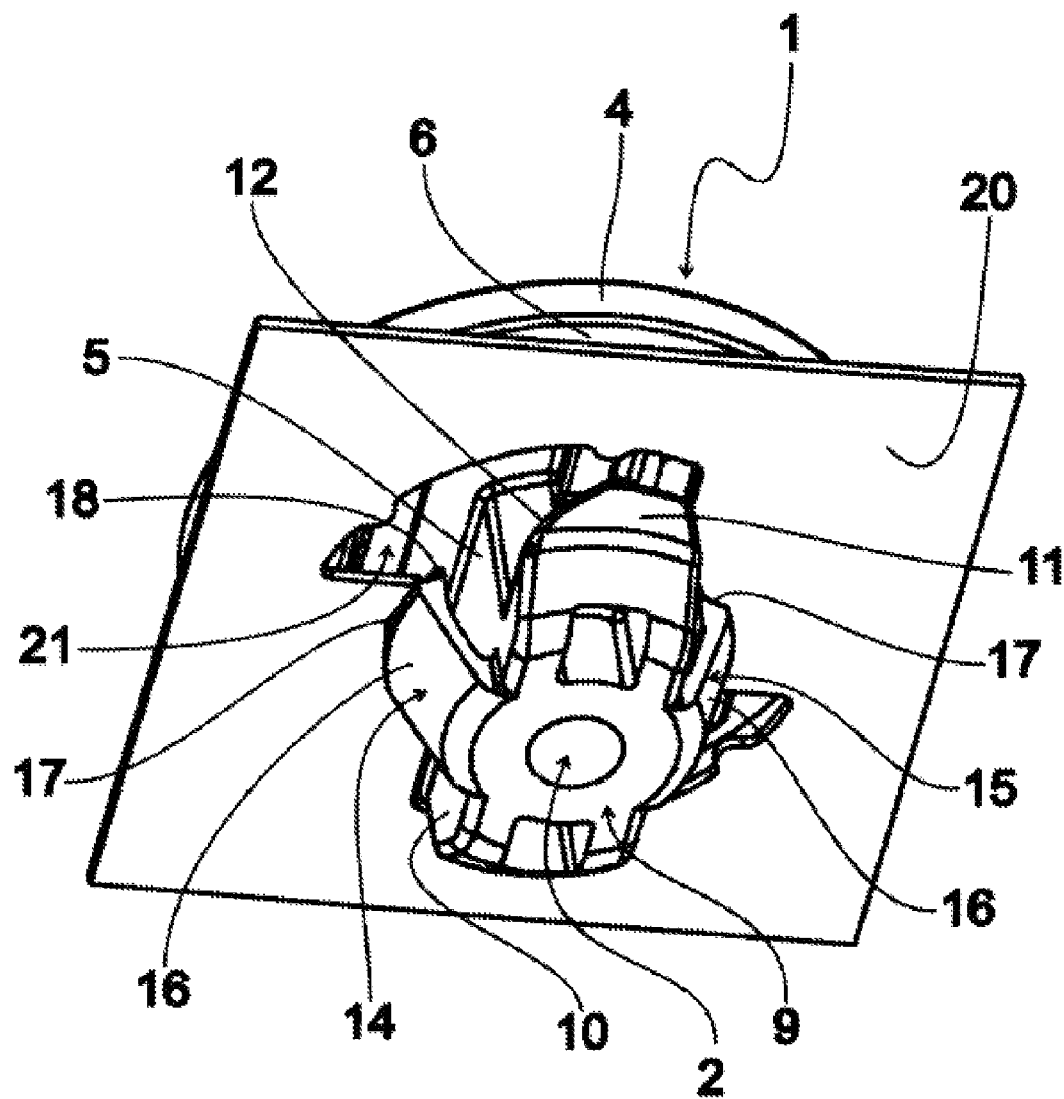
FIG. 2 shows a perspective view of the exemplary embodiment according to FIG. 1 engaged with a first component in a pre-secured position.

FIG. 2 shows a perspective view of the exemplary turnlock fastener 1 according to FIG. 1 in a final fixing arrangement in which it is engaged with a first component 20. The first component 20 is designed with an insertion opening 21 with dimensions such that, in a pre-secured position of the turnlock fastener 1 relative to the first component 20, unimpeded passage of the locking stands 10, 11 and passage of the spring limbs 14, 15 is provided under inward radial deflection of the center segment 16 of the spring limbs 14, 15 in the direction of the base shaft 5 with a subsequent outward radial deflection of the spring limbs 14, 15 away from the base shaft 5. The insertion opening 21 furthermore has dimensions such that the front surfaces 17 are in contact with the side of the first component 20 located opposite the cover plate 4 and the end crosspieces 18 are in contact with the inside edge of the insertion opening 21. In this way, the turnlock fastener 1 is anchored in the pre-secured position with the first component 20 and can also withstand relatively high pullout forces.

Figure 3:
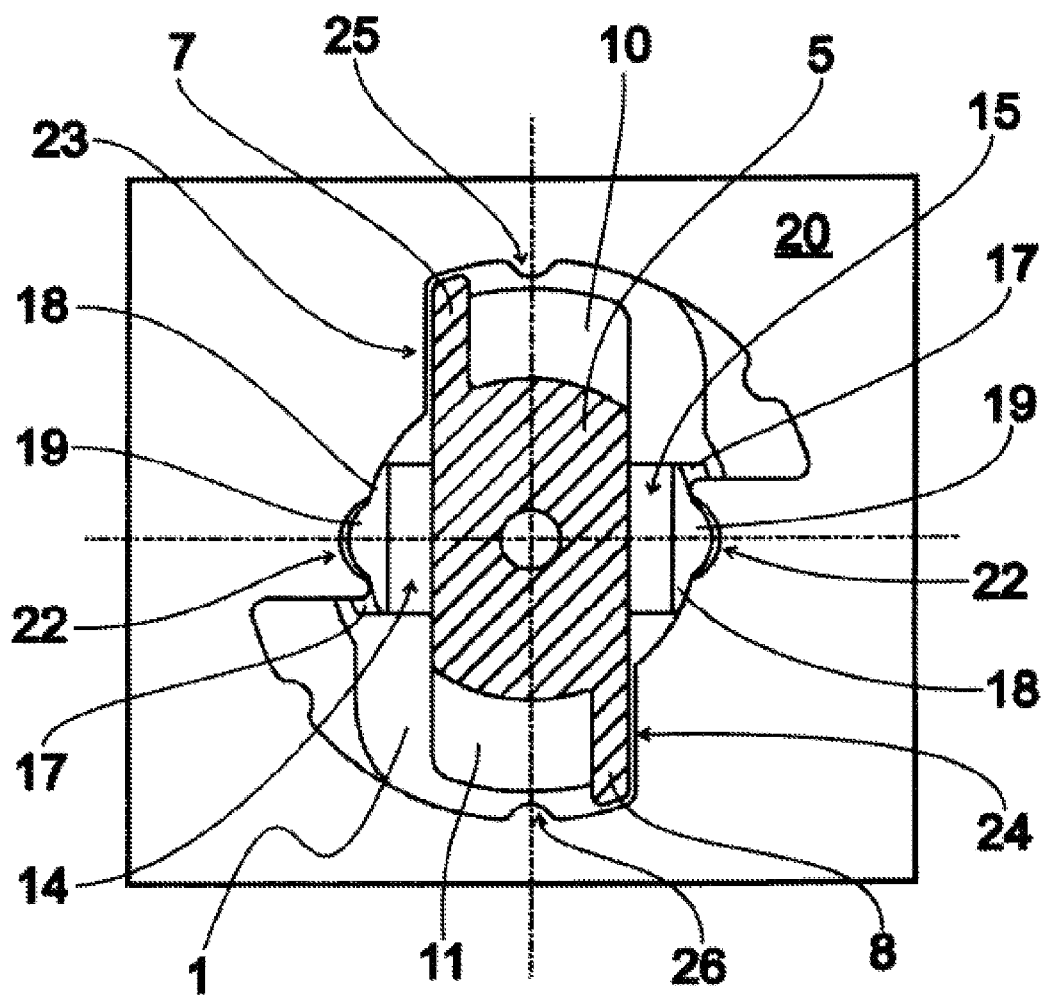
FIG. 3 shows a cross section of the exemplary embodiment according to FIG. 1 and FIG. 2 in the preliminary securing arrangement according to FIG. 2.

FIG. 3 shows a cross section of the turnlock fastener 1 according to FIG. 1 and FIG. 2 in the preliminary securing arrangement in the area of the stop crosspieces 7, 8. It can be seen from FIG. 3 that in the preliminary securing arrangement, the securing tabs 19 of the spring limbs 14, 15 engage with complementary securing openings 22 on the edge of the insertion opening 21 and thus secure the turnlock fastener 1 in the pre-secured position up to a certain removal force. It can also be seen from FIG. 3 that the stop crosspieces 7, 8 are each arranged near to a first stop area 23, 24 so that the turnlock fastener 1 is locked against turning in the direction of the first stop areas 23, 24.

In addition to the engagement of the securing tabs 19 and the securing openings 22, in order also to provide a securing of the turnlock fastener 1 against unintentional unscrewing from the preliminary securing arrangement, there are first securing cams 25, 26 provided on the edge of the insertion opening 21, which project radially inward and whose inward-facing front surfaces located radially on the inside have a smaller distance from one another than the distance between the radially outward-facing front surfaces of the stop crosspieces 7, 8.

Figure 4:
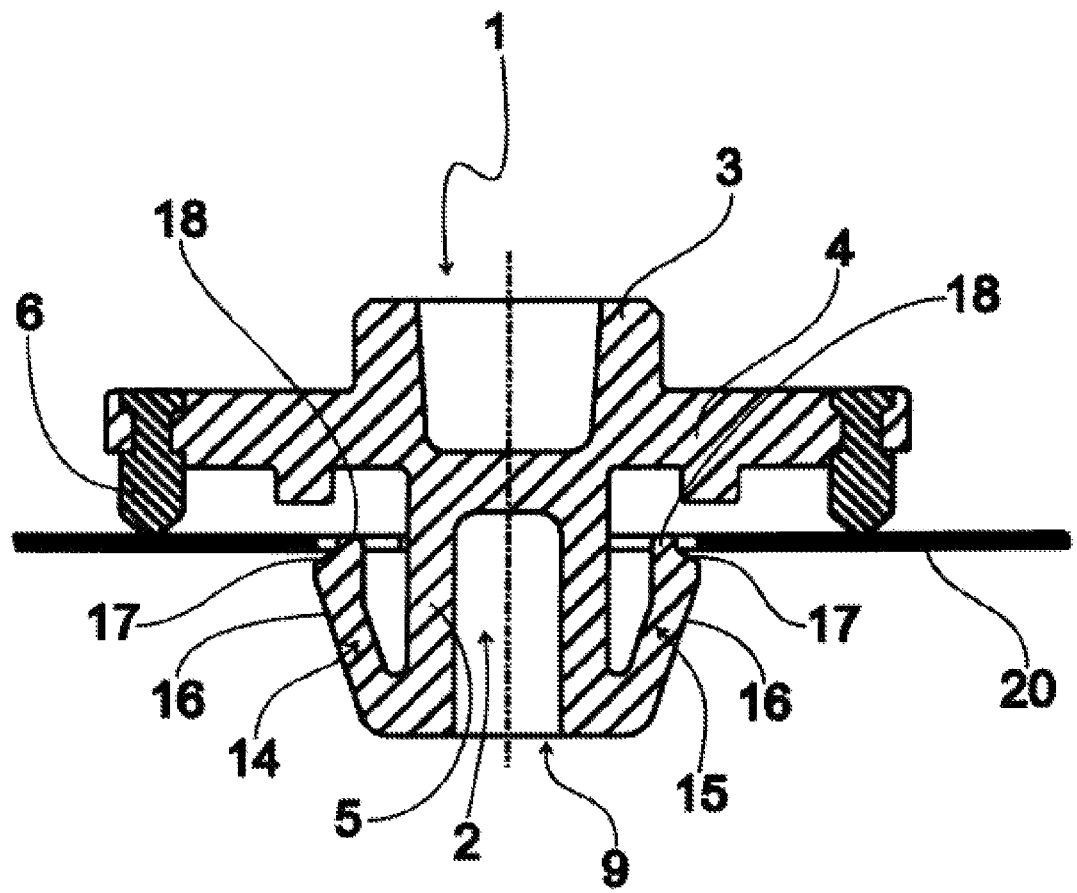
FIG. 4 shows a longitudinal section of the exemplary embodiment according to FIG. 1 to FIG. 3 in the preliminary securing arrangement.

FIG. 4 shows a longitudinal section of the turnlock fastener 1 according to the invention according to FIGS. 1 to 3 in the preliminary securing arrangement according to FIG. 2 and FIG. 3. It can be seen from FIG. 4 that, in the preliminary securing arrangement, the sealing lip 6 sits in contact with the first component 20 largely free of deformation or at most slightly deformed. Furthermore, it can be clearly seen from FIG. 4 that the spring limbs 14, 15 in the preliminary securing arrangement grip the first component 20 from behind along the edge of the insertion opening 21 section by section.

Figure 5:
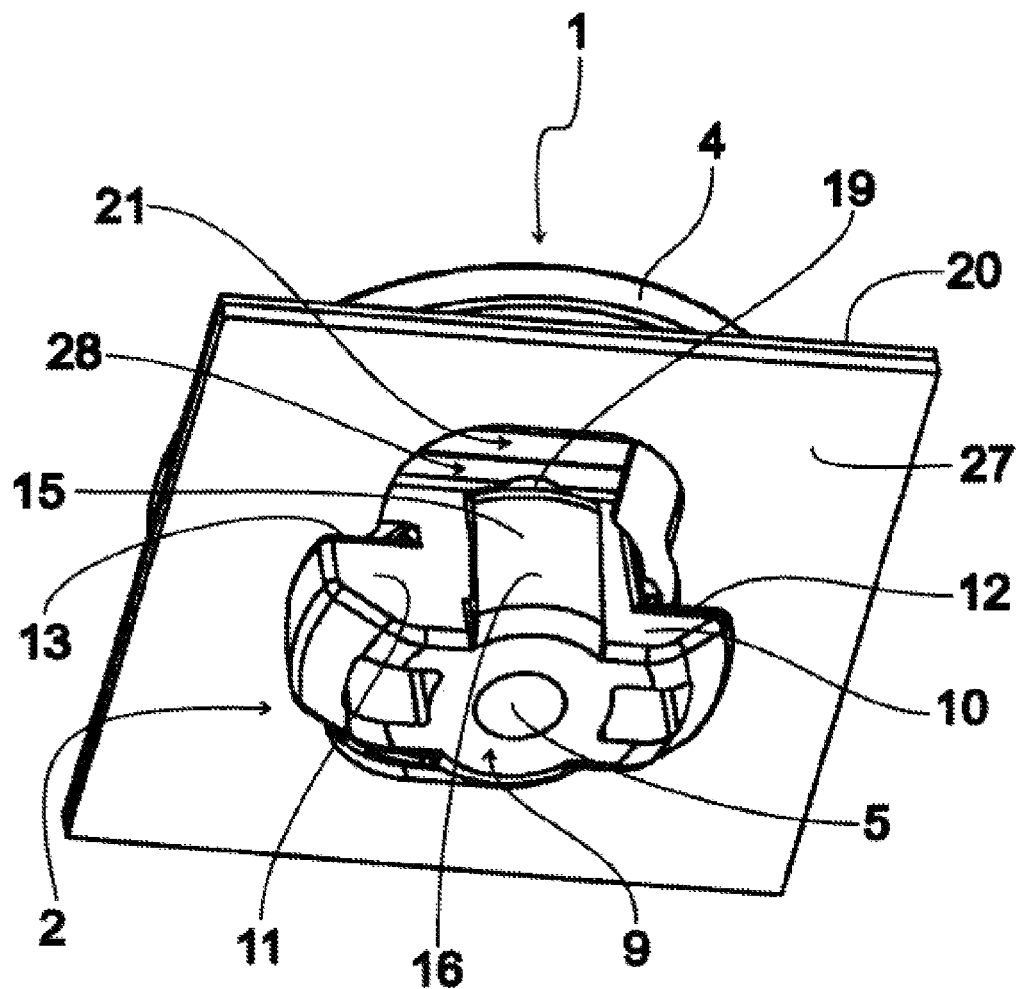
FIG. 5 shows a perspective view of the exemplary embodiment according to FIGS. 1 to 4 in a final fixing arrangement in which two components are connected with one another.

FIG. 5 shows a perspective view of the exemplary embodiment according to FIG. 1 in a final fixing arrangement in which the first component 20 is connected with a second component 27 so that the turnlock fastener 1 has been turned from the preliminary securing arrangement shown in FIGS. 2 to 4, typically by 90 degrees, in a direction of rotation in which the starting bevels 12 run into an edge of a pass-through opening 28 provided in the second component 27 and the contact sides 13 finally are in contact with the side of the second component 27 facing away from the cover plate 4. In the final fixing arrangement, the spring limbs 14, 15 sit without engagement in an area of the pass-through opening 28 designed for unimpeded passage of the locking stands 10, 11 as well as the insertion opening 21, so that the connecting function to connect the components 20, 27 is achieved solely by the effect of the locking stands 10, 11.

Figure 6:
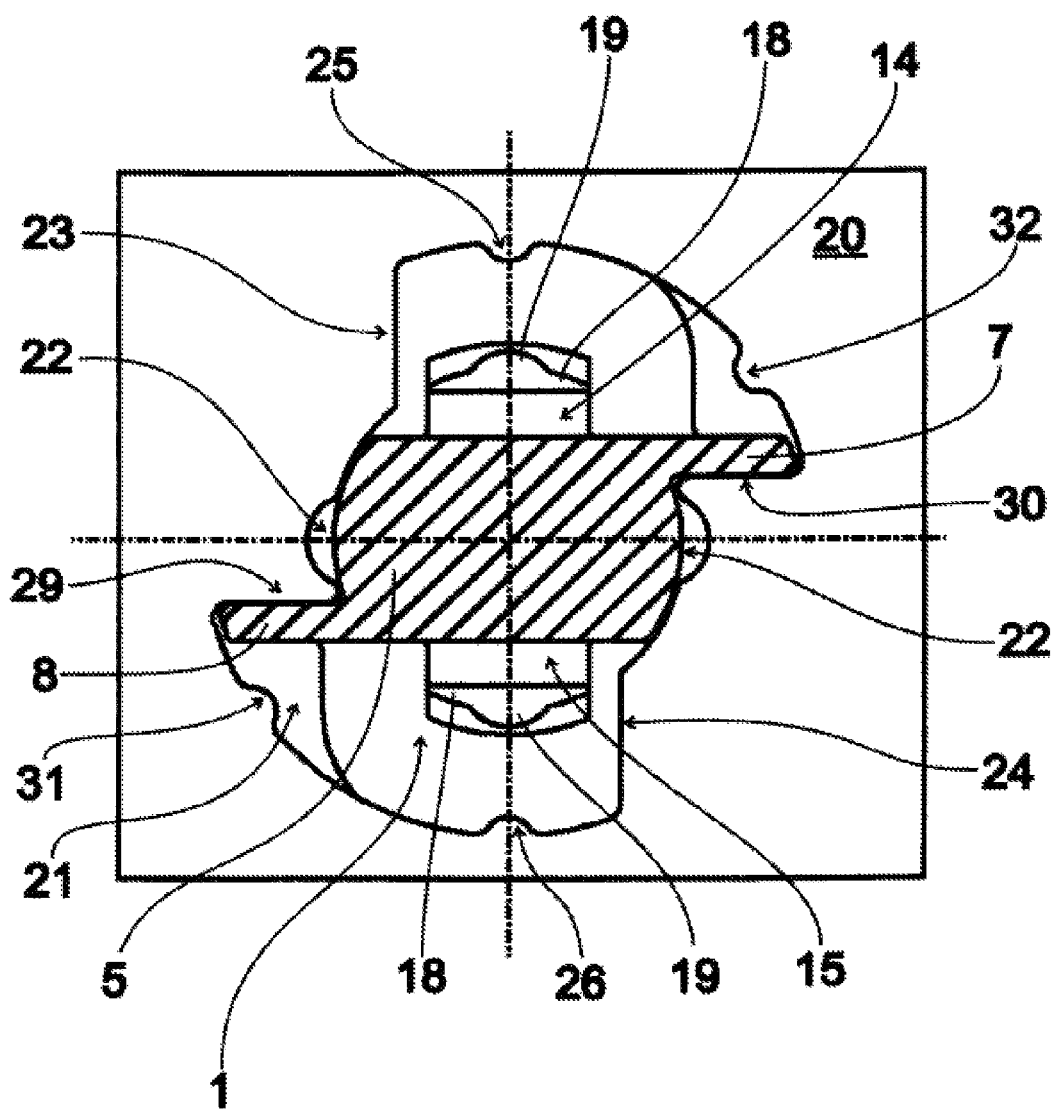
FIG. 6 shows a cross section of the exemplary embodiment according to FIGS. 1 to 5 in the final fixing arrangement according to FIG. 5.

FIG. 6 shows the turnlock fastener 1 in cross section in the area of the stop crosspieces 7, 8. It can be seen from FIG. 6 that in the final fixing arrangement, the stop crosspieces 8, 9 are in contact at second stop areas 29, 30 of the insertion opening 21 so that a further turning of the turnlock fastener 1 in the direction of rotation for the turnlock fastener 1 to exceed the preliminary securing arrangement is blocked in the final fixing arrangement. In order to prevent an unintentional removal of the turnlock fastener 1 against this direction of rotation from the final fixing arrangement according to FIG. 5 and FIG. 6, there are second securing cams 31, 32 provided along the edge of the insertion opening 21 at a certain distance from the second stop areas 29, 30, which project radially inward into the insertion opening 21. The distance between the radially inward-facing front surfaces of the second securing cams 31, 32 corresponds to the distance between the radially inward-facing front surfaces of the first securing cams 25, 26.

Figure 7:
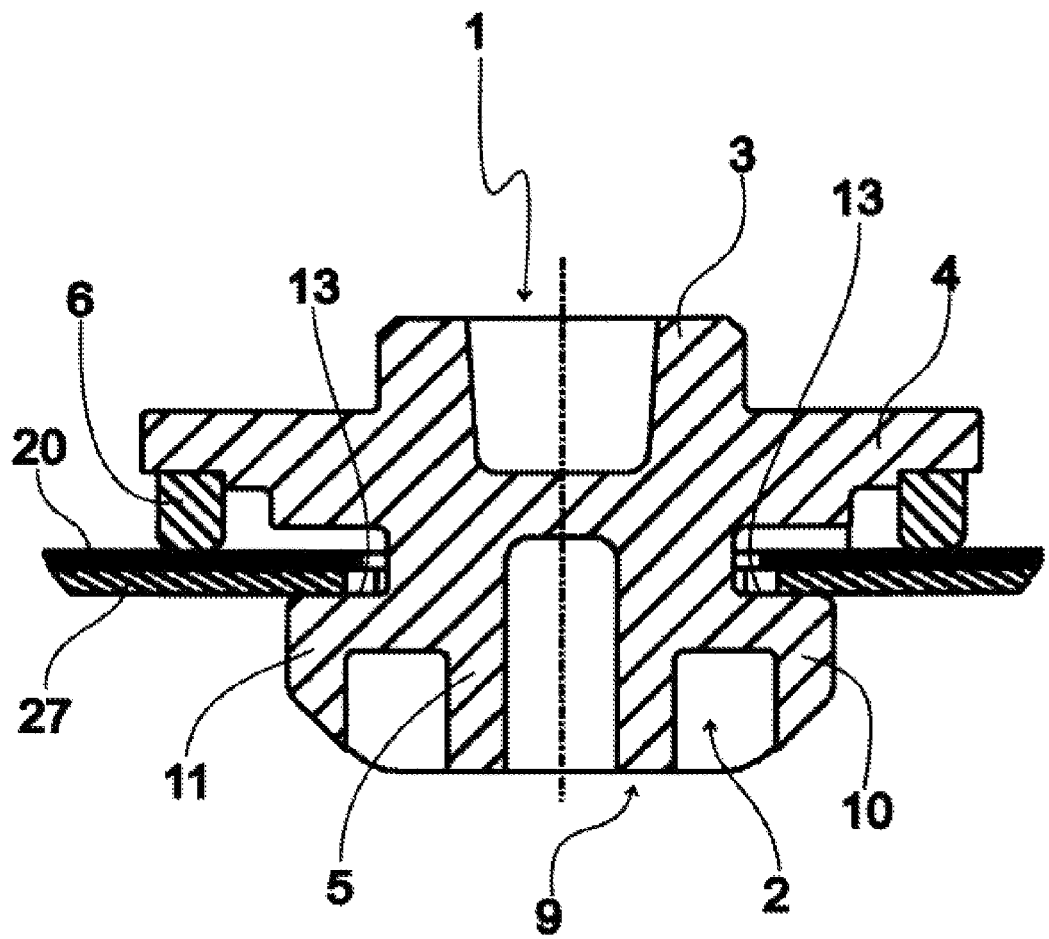
FIG. 7 shows a longitudinal section of the exemplary embodiment according to FIGS. 1 to 6 in the final fixing arrangement according to FIG. 5 and FIG. 6.

FIG. 7 shows a longitudinal section of the turnlock fastener 1 in the final fixing arrangement according to FIG. 5 and FIG. 6. It can be seen from FIG. 7 that, due to the effect of the contact sides 13 of the locking stands 10, 11 on the side of the second component 27 facing away from the cover plate 5 and at an appropriate distance between the contact sides 13 and the front surface of the sealing lip 6 facing away from the cover plate 4, the sealing lip 6 is deformed so that a seal of the insertion opening 21 and the pass-through opening 28 is achieved from the side of the first component 20 facing the cover plate 4.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A turnlock fastener for use in connecting two components, comprising:
   a cover plate;

a base shaft extending from said cover plate, said base shaft including at least two rigid locking stands spaced from said cover plate, said locking stands disposed opposite one another and extending radially outwardly from said base shaft, said locking stands each further including a contact side facing said cover plate, and a starting bevel facing a direction of rotation of said fastener;

a surrounding sealing lip made of a soft elastic material disposed on a side of said cover plate facing said base shaft, said sealing lip including a front side facing away from said cover plate, with a distance between said contact sides of said locking stands and said front side of said sealing lip dimensioned such that said sealing lip is deformable against at least one of the components to achieve a sealing effect; and a fixing arrangement for securing said turnlock fastener to a first component, said fixing arrangement including at least two radially elastic spring limbs, each said spring limb disposed circumferentially between a respective pair of said locking stands and including a first end connected to said base shaft and a second, free end extending away from said base shaft toward said cover plate, said spring limbs engagable from behind an insertion opening fashioned in a first component.

2. The turnlock fastener of claim 1, wherein said spring limbs and said locking stands are connected to said base shaft proximate a base end of said base shaft which is spaced from said cover plate.

3. The turnlock fastener of claim 1, wherein said locking stands extend radially outwardly from said base shaft at a right angle with respect to said base shaft.

4. The turnlock fastener of claim 1, wherein said contact sides of said locking stands are disposed parallel to said cover plate.

5. The turnlock fastener of claim 4, wherein each said locking stand includes a contact side aligned parallel to said cover plate.

6. The turnlock fastener of claim 1, wherein at least one spring limb includes a securing tab projecting radially outwardly from its second, free end.

7. The turnlock fastener of claim 1, wherein said cover plate includes at least one stop projection on a side thereof facing said base shaft, said at least one stop projection extending axially away from said cover plate.

8. The turnlock fastener of claim 1, wherein said cover plate includes a continuous sealing lip of a soft elastic material, said sealing lip attached to said cover plate on a side of said cover plate facing said base shaft.

* * * * *